(12) United States Patent
Chien et al.

(10) Patent No.: US 10,994,993 B2
(45) Date of Patent: May 4, 2021

(54) METHOD OF FORMING ENHANCED SUPER-RESOLUTION IMAGE

(71) Applicant: National Central University, Taoyuan (TW)

(72) Inventors: Fan-Ching Chien, Taoyuan (TW); Chun-Yu Lin, Taichung (TW)

(73) Assignee: National Central University, Taoyuan (TW)

( * ) Notice: Subject to any disclaimer, the term of this patent is extended or adjusted under 35 U.S.C. 154(b) by 0 days.

(21) Appl. No.: 16/547,607

(22) Filed: Aug. 22, 2019

(65) Prior Publication Data
US 2021/0053824 A1 Feb. 25, 2021

(51) Int. Cl.
| | |
|---|---|
| *B82Y 15/00* | (2011.01) |
| *B82Y 35/00* | (2011.01) |
| *G06T 3/40* | (2006.01) |
| *B82Y 30/00* | (2011.01) |
| *G01N 21/84* | (2006.01) |

(52) U.S. Cl.
CPC ............... *B82Y 35/00* (2013.01); *B82Y 30/00* (2013.01); *G01N 21/8422* (2013.01); *G06T 3/4053* (2013.01); *G01N 2021/8438* (2013.01)

(58) Field of Classification Search
CPC ..... B82Y 35/00; B82Y 30/00; G01N 21/8422
See application file for complete search history.

(56) References Cited

U.S. PATENT DOCUMENTS

| | | | |
|---|---|---|---|
| 2009/0023135 A1* | 1/2009 | Sun | G01N 33/54306 435/6.11 |
| 2009/0141376 A1* | 6/2009 | Smith | G02B 5/04 359/833 |

(Continued)

FOREIGN PATENT DOCUMENTS

| | | |
|---|---|---|
| CN | 101868711 A | 10/2010 |
| WO | 2019/122161 A1 | 6/2019 |

OTHER PUBLICATIONS

Chien et al., "Enhancing the blinking fluorescence of single-molecule localization imaging by using a surface-plasmon-polariton-enhanced substrate," Phys. Chem. Chem. Phys., Nov. 7, 2018, 20(43), pp. 27245-27255.

(Continued)

*Primary Examiner* — Hugh Maupin
(74) *Attorney, Agent, or Firm* — CKC & Partners Co., LLC (57) ABSTRACT

A method of forming an enhanced super-resolution image is provided. The method includes: preparing a substrate comprising a glass substrate, a metal layer on the glass substrate, and a biolayer on the metal layer; placing a biological specimen on the substrate, the biological specimen being in contact with the biolayer and being attached to the metal layer through the biolayer, in which the biological specimen is labeled by a plurality of spontaneous blinking elements therein; irradiating a light beam to the metal layer via the glass substrate; receiving fluorescence signals emitted from the spontaneous blinking elements within a time period; fitting a plurality of functions respectively to each of the fluorescence signals; pinpointing peak positions of the functions; and reconstructing the peak positions to derive the enhanced super-resolution image of an underlying structure of the biological specimen in proximity to the metal layer.

9 Claims, 9 Drawing Sheets

(56) References Cited

U.S. PATENT DOCUMENTS

2009/0230322 A1* 9/2009 Russell ............ G01N 33/54346
 250/459.1
2013/0078740 A1* 3/2013 Miller ................ G01N 21/6428
 436/501
2017/0315115 A1* 11/2017 Prins .................. G01N 33/6872

OTHER PUBLICATIONS

Sebastian van de Linde et al., "Direct stochastic optical reconstruction microscopy with standard fluorescent probes," nature protocols, vol. 6, No. 7, 2011, pp. 991-1009.

* cited by examiner

METHOD OF FORMING ENHANCED SUPER-RESOLUTION IMAGE

BACKGROUND

Field of Invention

The present disclosure relates to a method of forming an enhanced super-resolution image with a low power incident light beam and high spatial resolution.

Description of Related Art

The statements in this section merely provide background information related to the present disclosure and do not necessarily constitute prior art.

Since Galileo Galilei invented an optical microscope in 1609, the optical microscope has become one of the most commonly used scientific instruments of mankind. Optical microscope allows human to probe the micro meter scale world which leads to a great advancement in biology, chemistry, physics, and most significantly in medicine. However, conventional optical microscopes suffer from a natural limitation: diffraction limit of an incident light beam for probing a target specimen, which is approximately half of a wavelength of an incident light beam. One way to conquer this natural barrier is to use a shorter wavelength light beam (e.g., using UV or X-ray), or even an electron beam for probing the target specimen. However, such types of microscopes suffer from lack of contrast in biological sample and may also damage the biological sample. Another way is to use evanescent waves. Specifically, the diffraction limit which limits the resolution is fundamentally related to diffractions and loss of evanescent waves that carry high-spatial frequency. The evanescent waves can carry subwavelength information of the target sample and decay exponentially with distance from the target sample.

Many ways of using the evanescent waves to overcome the diffraction limit (i.e., to derive a super-resolution image) have been developed during the past two decades. One of them is to develop a single-molecule localization microscopy in which fluorophores around a scale of less than 10 nm are used to label the target sample. Fluorophores are excited by evanescent waves and the exited fluorescence signals are detected and analyzed to reconstruct an image of the target sample.

Nowadays, single-molecule localization microscopy with spatial resolution beyond the diffraction limit as mentioned has obtained many impressive results in several research fields, including cell biology, neuroscience, and microbiology. Lateral and axial spatial resolutions of live-cell super-resolution localization images are obtained at approximately 30 nm and 50 nm, and a temporal resolution has achieved 1-2 seconds. Some types of the single-molecule localization microscopies become commercially available, such as (fluorescence) photoactivated localization microscopy ([F]PALM) and (direct) STORM ([d]STORM). In these (standard) techniques, excitation intensity of a light beam at a scale of kilo $W/cm^2$ is used for generating fluorescence signals. The high intensity irradiation as mentioned is necessary for the fluorophores to be switched between a fluorescence state and a dark state. However, photodamages may accumulate and interfere with cell functions during the high intensity irradiation, and sometimes even causing cell death. Some new types of fluorophores are developed and can be used under a light beam with lower excitation intensity. However, the signals of these new types of fluorophores are too weak and suffers from inconvenience in practical applications.

SUMMARY

According to some embodiments of the present disclosure, a method of forming an enhanced super-resolution image is provided. The method includes: preparing a substrate comprising a glass substrate, a metal layer on the glass substrate, and a biolayer on the metal layer; placing a biological specimen on the substrate, the biological specimen being in contact with the biolayer and being attached to the metal layer through the biolayer, in which the biological specimen is labeled by a plurality of spontaneous blinking elements therein; irradiating a light beam to the metal layer via the glass substrate; receiving fluorescence signals emitted from the spontaneous blinking elements within a time period; fitting a plurality of functions respectively to each of the fluorescence signals; pinpointing peak positions of the functions; and reconstructing the peak positions to derive the enhanced super-resolution image of an underlying structure of the biological specimen in proximity to the metal layer.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

In various embodiments, description is made with reference to figures. However, certain embodiments may be practiced without one or more of these specific details, or in combination with other known methods and configurations. In the following description, numerous specific details are set forth, such as specific configurations, dimensions and processes, etc., in order to provide a thorough understanding of the present disclosure. In other instances, well-known semiconductor processes and manufacturing techniques have not been described in particular detail in order to not unnecessarily obscure the present disclosure. Reference throughout this specification to "one embodiment," "an embodiment", "some embodiments" or the like means that a particular feature, structure, configuration, or characteristic described in connection with the embodiment is included in at least one embodiment of the disclosure. Thus, the appearances of the phrase "in one embodiment," "in an embodiment", "in some embodiments" or the like in various places throughout this specification are not necessarily referring to the same embodiment of the disclosure. Furthermore, the particular features, structures, configurations, or characteristics may be combined in any suitable manner in one or more embodiments.

Figure 1:
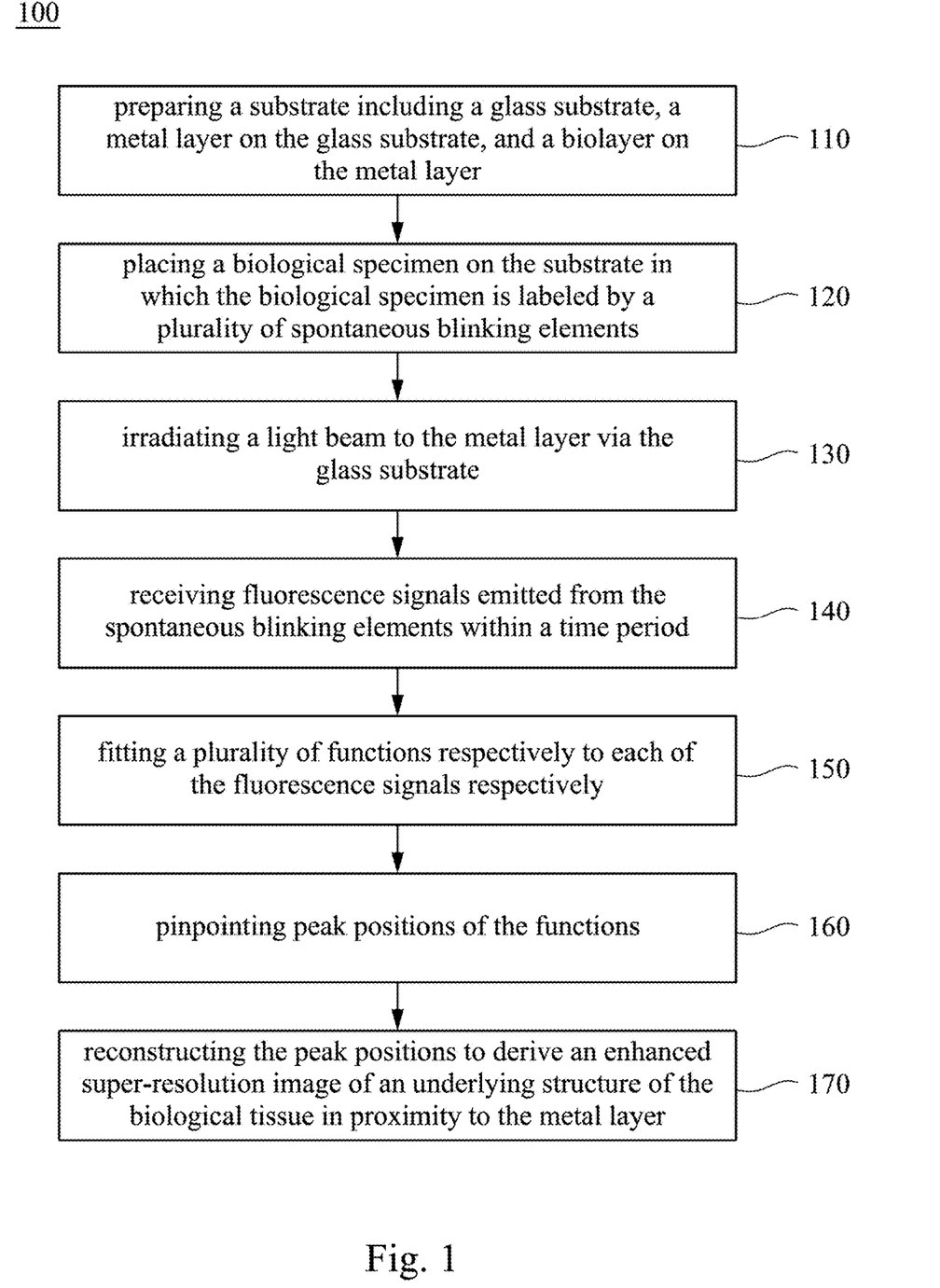
FIG. 1 is a flowchart of a method of forming an enhanced super-resolution image according to some embodiments of the present disclosure.
Figure 2:
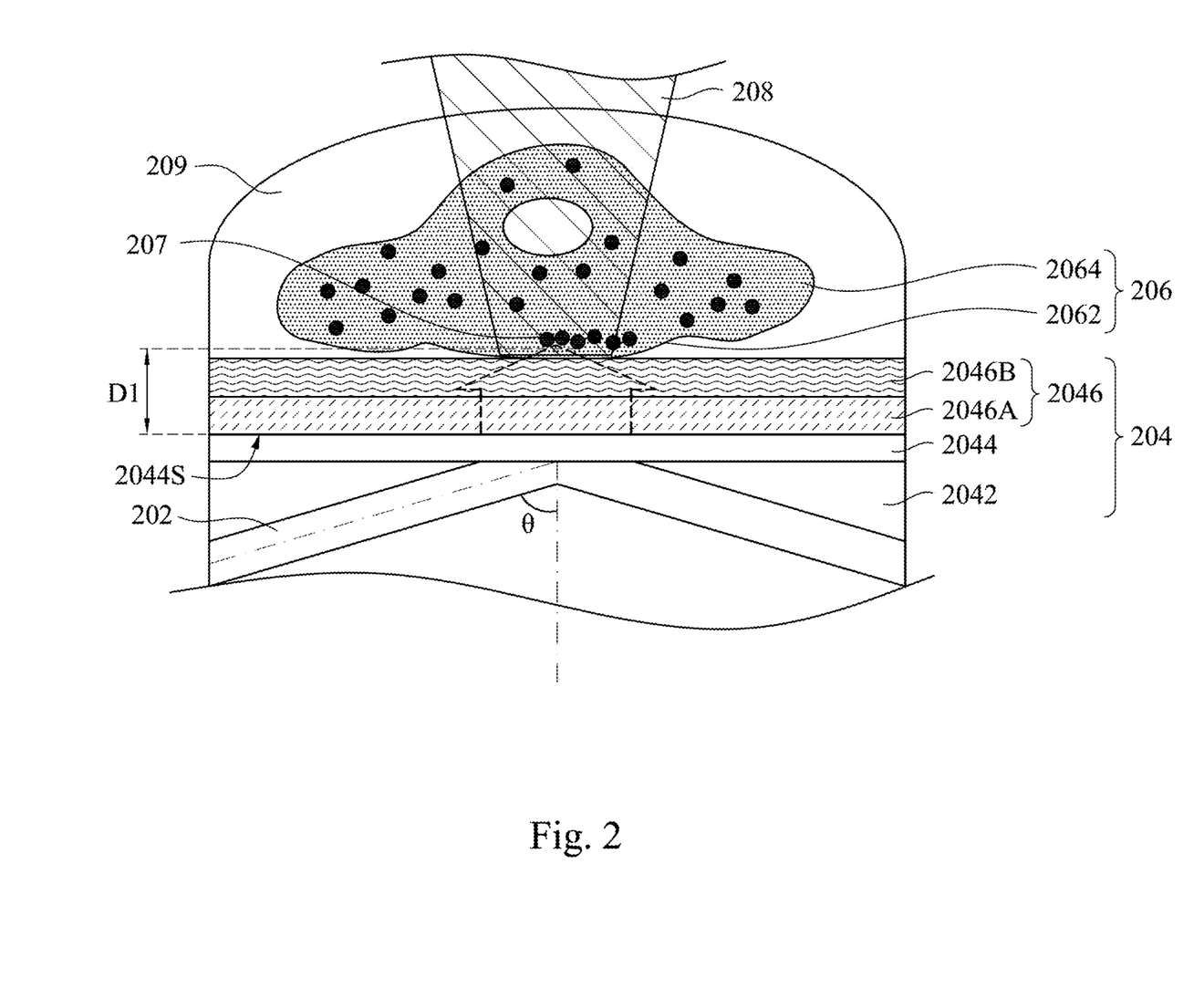
FIG. 2 is a schematic cross-sectional view illustrating a light beam irradiating a substrate with a biological specimen thereon according to some embodiments of the present disclosure.

Reference is made to FIGS. 1 and 2. FIG. 1 is a flowchart of a method 100 of forming an enhanced super-resolution image according to some embodiments of the present disclosure. FIG. 2 is a schematic cross-sectional view illustrating a light beam 202 irradiating a substrate 204 with a biological specimen 206 thereon according to some embodiments of the present disclosure. The method 100 begins with operation 110 in which the substrate 204 including a glass substrate 2042 (e.g., a glass coverslip, but should not be limited thereto), a metal layer 2044 on the glass substrate 2042, and a biolayer 2046 on the metal layer 2044 is prepared. The method 100 continues with operation 120 in which a biological specimen 206 is placed on the substrate 204. The biological specimen 206 is in contact with the biolayer 2046 and is attached to the metal layer 2044 through the biolayer 2046. The biological specimen 206 is labeled by a plurality of spontaneous blinking elements 207. The method 100 continues with operations 130 and 140 in which the light beam 202 is irradiated to the metal layer 2044 via the glass substrate 2042, and then fluorescence signals 208 emitted from the spontaneous blinking elements 207 are received within a time period. The method 100 continues with operations 150, 160, and 170 in which a plurality of functions are fitted respectively to each of the fluorescence signals 208, peak positions of the functions are pinpointed, and the peak positions are reconstructed to derive the enhanced super-resolution image of an underlying structure of the biological specimen 206 in proximity to the metal layer 2044.

In some embodiments, the metal layer 2044 is a flat silver (Ag) layer without nanostructure therein, and a root mean square of roughness of the flat Ag layer is less than or equal to about 5 nm. The "without nanostructure" herein means a portion of the flat Ag layer directly beneath the biological specimen 206 under irradiation of the light beam 202 meets the condition regarding the roughness as mentioned. The condition regarding the roughness can provide a uniform distribution of the surface plasmon polariton (SPP)-enhanced field on a surface of the flat Ag layer, enabling visualization of the spatial distribution of labeled proteins without interference caused by the enhanced field distribution compared to conventional ways which use metal nanostructures or nanoparticles in a single-molecule localization microscopy when visualizing real distributions of biological specimens 206. In addition, the conventional ways as mentioned may cause shift between the imaging positions and real positions of molecules generated by plasmonic coupling on the metal nanostructures and nanoparticles. These deficiencies are remedied by the flat Ag layer as mentioned. In some embodiments, a thickness of the Ag layer is in a range between about 45 nm and about 55 nm, so as to facilitate enhancement of the light beam 202 through the surface plasmon polariton (SPP). In some embodiments, the thickness of the Ag layer is 50 nm (e.g., embodiments which will be illustrated by FIG. 3 later). In some embodiments, the thickness of the Ag layer is 44 nm (e.g., embodiments which will be illustrated by FIG. 8 later). In some other embodiments, the metal layer 2044 can be made of other metals, such as gold (Au), and should not be limited thereto.

In some embodiments, the biolayer 2046 includes a thiolate layer 2046A and a protein layer 2046B on the thiolate layer 2046A. The thiolate layer 2046A is in contact with the metal layer 2044, and the protein layer 2046B is in contact with the biological specimen 206. In some embodiments, the protein layer 2046B can be extracellular matrix (ECM) proteins (e.g., fibronectin, collagens and etc.), but should not be limited thereto. Taking a combination of the thiolate layer 2046A and the fibronectin as an example, the combination can facilitate cell adhesion of the biological specimen 206 to the metal layer 2044. Specifically, one end of the thiolate layer 2046A contains sulfur (S) which tends to (covalently) bond to the metal layer 2044. The other end of the thiolate layer 2046A contains functional groups such as amino ($R-NH_2$) or carboxylic acid ($R-COOH$). Functional groups on the fibronectin (e.g., $R-COOH$ or $R-NH_2$) tend to (covalently) bond to the thiolate layer 2046A. As a result, the fibronectin can be firmly attached above the metal layer 2044 without being taken away by the biological specimen 206. In addition, proteins on a surface of the biological specimen 206 tend to attach to the fibronectin. Therefore, the attachment of the biological specimen 206 on the metal layer 2044 can be strong and stable.

The spontaneous blinking elements 207 can be spontaneous blinking fluorophores or blinking quantum dot materials. The spontaneous blinking fluorophores are some types of fluorophores that include rhodamine derivatives with an intramolecular spirocyclization, such as HydroxyMethyl Silicon-Rhodamine (HMSiR) and HEtetTFER, but should not be limited thereto. Rhodamine derivatives bearing an intramolecular nucleophile and electrophile existed in a thermal equilibrium between a fluorescent open form (i.e., fluorescent ON) and a non-fluorescent spirocyclic form (i.e., fluorescent OFF). These two forms interconvert via an intramolecular spirocyclization reaction. The spontaneous blinking fluorophores shows spontaneous blinking, and this is the key to obtain super-resolution images under physiological conditions at low intensity of the light beam 202. Specifically, taking advantage of the mechanism of the spontaneous blinking fluorophores as mentioned can overcome the high intensity irradiation requirement for switching conventional fluorophores between the fluorescent state and the dark state.

The quantum dot materials can be core-shell CdSe/ZnS nanocrystals, but should not be limited thereto. A blinking effect occurs in presence of a single quantum dot. The origin of the blinking effect in quantum dots can be attributed to surface defect states thereof. The blinking effect of quantum dots offers an opportunity to achieve super-resolution imaging where signals from an individual quantum dot within a diffraction limited area can be distinguished through the blinking effect. A blinking rate can be modified by increasing a lifetime of the surface defect states by using ascorbic acid solution for example, and the fluorescence bleach time is thus reduced.

The substrate 204 can be fabricated by a specific method as follows, but should not be limited thereto. First, the metal layer 2044 is deposited on the glass substrate 2042. The deposition can be performed by a radiofrequency sputtering deposition system, thermal evaporation, and e-gun evaporation for example. The glass substrate 2042 can be a flat Ag layer with a thickness of 50 nm. A combination of the metal layer 2044 and the glass substrate 2042 (hereinafter referred to as "SPP-enhanced substrate") is then soaked in 1 mM 2-aminoethanethiol hydrochloride solution. After six hours, the SPP-enhanced substrate is rinsed with ethanol and dried with nitrogen gas. Then, the SPP-enhanced substrate is soaked for 12 hours in a 2 mM N-ethyl-N-(3-dimethylaminopropyl) carbodiimide hydrochloride and 5 mM N-hydroxysuccinimide solution. After a second rinse, the SPP-enhanced substrate is soaked in a 1×phosphate buffered saline (PBS) solution containing 2 µM fibronectin molecules. After twelve hours and a rinse with a 1×PBS solution, the fibronectin molecules are immobilized covalently on the SPP-enhanced substrate.

In some embodiments, the biological specimen 206 includes a cell membrane 2062 and a cytoplasm 2064, and the spontaneous blinking elements 207 are within the cytoplasm 2064 and/or on the cell membrane 2062. Specifically, a shortest distance D1 between the spontaneous blinking elements 207 and the metal layer 2044 is greater than or equal to about 10 nm, so as to avoid quenching of the fluorescence signals 208. When the spontaneous blinking elements 207 are less than 10 nm from a surface 2044S of the metal layer 2044 in contact with the biolayer 2046, the surface 2044S of the metal layer 2044 provides an energy dissipation by near-field coupling and nonradiative damping to induce quenching of the fluorophores. The above condition on the shortest distance D1 can be realized by modifying a thickness of the fibronectin when the fibronectin and the thiolate layer 2046A are deposited on the metal layer 2044.

Figure 3:
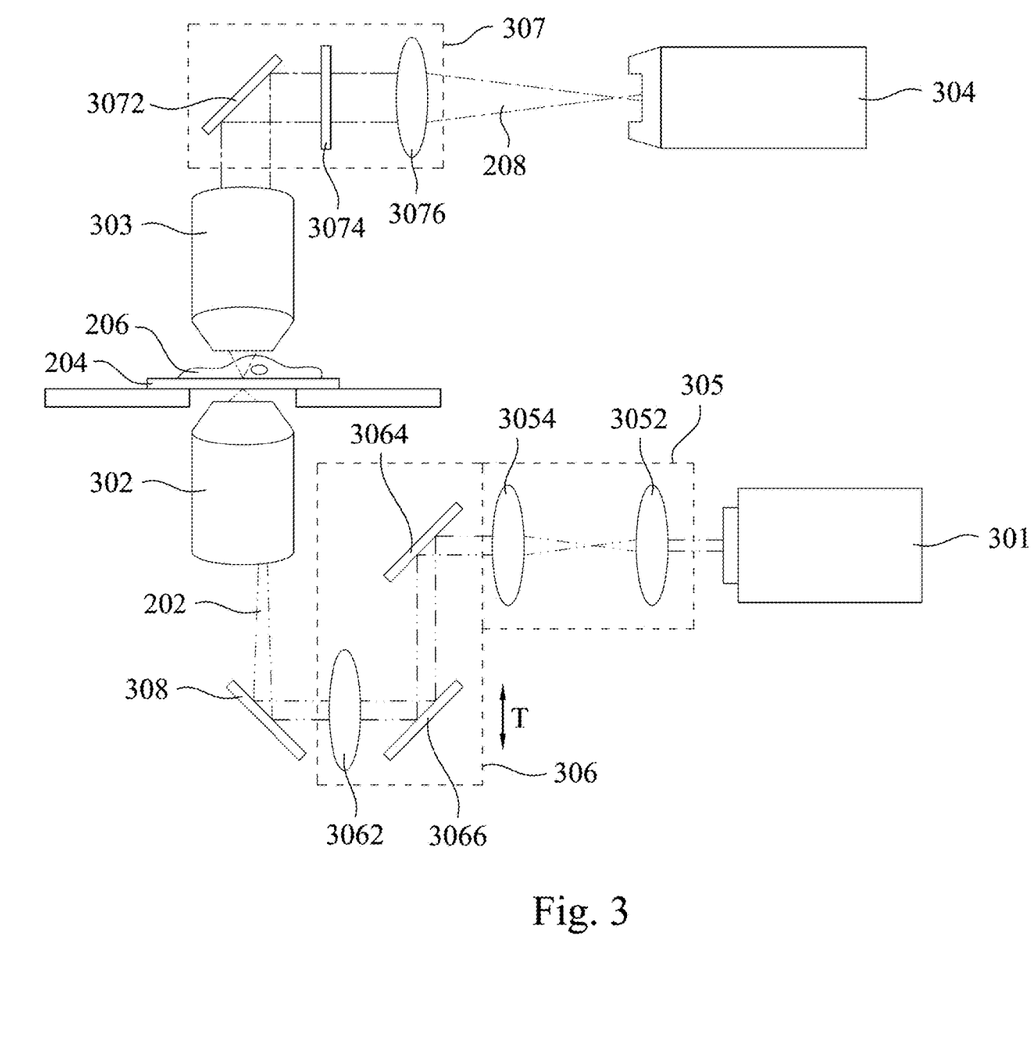
FIG. 3 is a schematic optical path diagram of an optical imaging system according to some embodiments of the present disclosure.

Reference is made to FIG. 3. FIG. 3 is a schematic optical path diagram of an optical imaging system 300A according to some embodiments of the present disclosure. Fluorescence images of the biological specimen 206 are obtained using the optical imaging system 300A (e.g., fluorescence imaging system) in a total internal reflection (TIR) excitation configuration, as referred simultaneously to FIGS. 2 and 3. In some embodiments, the optical imaging system 300A includes a light source 301, a first objective lens 302, a second objective lens 303, and a light collecting device 304. In some embodiments, the optical imaging system 300A further includes a beam expander 305, a shifting module 306, and an imaging module 307 in order to guide and select fluorescence signals 208 to image on the light collective device 304. In some embodiments, the beam expander 305 includes two lenses 3052 and 3054 to expand a diameter of the light beam 202. In some embodiments, the shifting module 306 includes a lens 3062 and two mirrors 3064 and 3066. The imaging module 307 may include a mirror 3072, an emission filter 3074, and a lens 3076. The light beam 202 is generated by the light source 301. The light source 301 can be a diode laser, but should not be limited thereto. In some embodiments, a wavelength of the light beam 202 is about 637 nm, but should not be limited thereto. In some embodiments, the beam expander 305 and the shifting module 306 are present in an optical path of the light beam 202. Specifically, after passing through the beam expander 305 and the shifting module 306, the light beam 202 is focused at a point on a back focal plane of the first objective lens 302 with a shifted distance with respect to a back focal point of the first objective lens 302 by using the lens 3062 of the shifting module 306. The shifted distance is tuned by using the shifting module 306 and a translational stage T (not explicitly drawn in FIG. 3).

The magnification and the numerical aperture (NA) of the first objective lens 302 (e.g., an oil-immersion objective lens) can be 60× and 1.49, respectively, but should not be limited thereto. The light beam 202 is focused on an outer region of the back focal plane of the first objective lens 302 to generate a highly oblique collimating output beam. The substrate 204 seeded with the biological specimen 206 is atop the first objective lens 302. After passing through the first objective lens 302, the light beam 202 is coupled to the substrate 204 with the immersion oil. The light beam 202 obliquely irradiates an interface between the glass substrate 2042 and the metal layer 2044 on the SPP-enhanced substrate. The incident angle θ between a direction of the light beam 202 and a normal direction of the metal layer 2044 is greater than a critical angle for achieving a TIR and/or the SPP excitation. In some embodiments, the incident angle θ is in a range between about 68.5 degrees and about 75 degrees. This range can be used for testing a SPP enhancement of the optical imaging system 300A with/without the biological specimen 206 thereon. The incident angle θ is adjusted using the shifting module 306 to control a position of the focusing spot on the back focal plane of the first objective lens 302. When the SPP-enhanced substrate is used, the incident angle θ is adjusted to match the excitation condition of the SPPs (i.e., to a resonance angle of the SPP-enhanced substrate) or surface plasmon-coupled emission (SPCE) (i.e., to an angle of the maximum surface plasmon-coupled emission). Optimized incident angle θ can also be found by performing simulations according to the following equation which represents a detected fluorescence signal intensity (F) of fluorophores caused by the SPP enhancement and the SPCE of a metal surface versus incident angle θ:

$$F \propto \left[ P_{ex} < \left( \frac{|E_{loc}|}{|E_0|} \right)^2 > \right] Q_{en} \times Q_e \quad (1)$$

where $P_{ex}$ is an excitation power; $E_{loc}$ and $E_0$ are local electric field with and without SPP enhancement, respectively; and $Q_{en}$ and $Q_{ec}$ are modified quantum yield of the fluorophores and emission coupling yield, respectively. Briefly, the detected fluorescence signal intensity is proportional to a product of the excitation power, a local field enhancement factor, the modified quantum yield, and the emission coupling yield. By inserting parameters (e.g., partitivities, thicknesses, quantum yield, fluorescence wavelength, etc.) of the materials used in a structure shown in FIG. 2 for example, variations of electric field enhancement, modified quantum yield of the fluorophores, and emission coupling yield with respect to the incident angle θ can be derived. Thus, the optimized incident angle θ can be preliminary derived.

Details of some specific embodiments on deriving super-resolution images are illustrated as follows, but should not be limited thereto. HMSiR fluorophores (one type of the spontaneous blinking elements 207 as mentioned), which stain vinculin proteins of the focal adhesions (one example of the cytoplasm 2064 of the biological specimen 206), are recorded at 24 Hz to generate a fluorescence image stack with 14000 frames. That is, the fluorescence image stack contains a plurality of fluorescence images. Each of the fluorescence images contains only a few fluorescence spots (made of fluorescence signals 208) of the HMSiR fluorophores. The diffraction-limited summed fluorescence image stack of the focal adhesions is obtained by summing the fluorescence signals 208 across all the frames (heretofore in this paragraph belongs to operation 140). Single-molecule localization images of the focal adhesions are obtained through performing super-resolution localization and reconstruction on the fluorescence images. Each fluorescence image of the fluorescence image stack is used to extract locations of the fluorescence spots by using a local maximum algorithm. Details of the local maximum algorithm may be found elsewhere (e.g., S. Van De Linde et al. *Nat. Protoc.*, 2011, 6, 991-1009), and will not be described herein. Then, each fluorescence spot in a window of 5×5 pixels is fitted with a two-dimensional (2D) elliptical Gaussian function to obtain its amplitude, centroid position, width, and background. The effective pixel size is approximately 111 nm×111 nm (heretofore in this paragraph belongs to operation 150).

An intensity threshold ($I_{th}$) is applied to remove a portion of the fluorescence spot emitted from multiple fluorophores with a spacing less than the diffraction limit. To obtain the intensity threshold ($I_{th}$), intensities of a time trace of a single HMSiR fluorophore coated on the SPP-enhanced substrate are used to calculate the intensity histogram. An emission intensity distribution of a single HMSiR fluorophore in the intensity histogram is fitted with the Gaussian function to obtain a mean value ($I_f$) and a standard deviation (m). The intensity threshold for the fluorescence spot with only one HMSiR fluorophore in a fluorescent state is set to $I_{th}=I_f\pm\sigma_f$. If an ellipticity of the fluorescence spot is more than 15%, the fluorescence spot is considered as being emitted from multiple fluorophores and hence removed. Moreover, the fluorescence spot emitted from the HMSiR fluorophore may appear in consecutive frames. Therefore, fluorescence spots with a spacing of less than one pixel in consecutive frames are considered as being emitted from the same HMSiR fluorophore. The positions of the HMSiR fluorophore in all consecutive frames are averaged using a weighted approach depending on the number of photons in each frame to obtain its final centroid position. The fluorescence spots appearing in consecutive frames as mentioned are considered as a single localization event. Furthermore, the localization resolution (i.e., a localization uncertainty) is determined from the total number of photons of a localization event. Thus, the single-molecule localization image of the focal adhesions is rendered by plotting each HMSiR fluorophore as a normalized Gaussian spot. The centroid position and the localization uncertainty of the HMSiR fluorophore are used to determine the centroid position and the width of the Gaussian spot. Additionally, to obtain a raw fluorescence intensity of each localization event, raw intensities for a fluorescence spot in a fitting window of 5×5 pixels are subtracted from an average intensity of edge pixels in the fitting window and then summed. If a localization event occurs in consecutive frames (i.e., the fluorescence spot appears in consecutive frames), the intensity results for these consecutive frames are summed to obtain the raw fluorescence intensity of the localization event (heretofore in this paragraph belongs to operations 150 and 160).

In some embodiments, the second objective lens 303 is a water-immersion objective, and an NA of the second objective lens 303 is about 0.9, but should not be limited thereto. An emission filter 3074 of the imaging module 307 can be used to select a wavelength of the fluorescence signals 208. The light collecting device 304 can be a high-speed electron multiplying charge-coupled device camera, or a scientific complementary metal-oxide-semiconductor (sCMOS) camera, but should not be limited thereto. The light collecting device 304 is used to collect the fluorescence signals 208 from the spontaneous blinking elements 207 within the biological specimen 206.

Figure 4A:
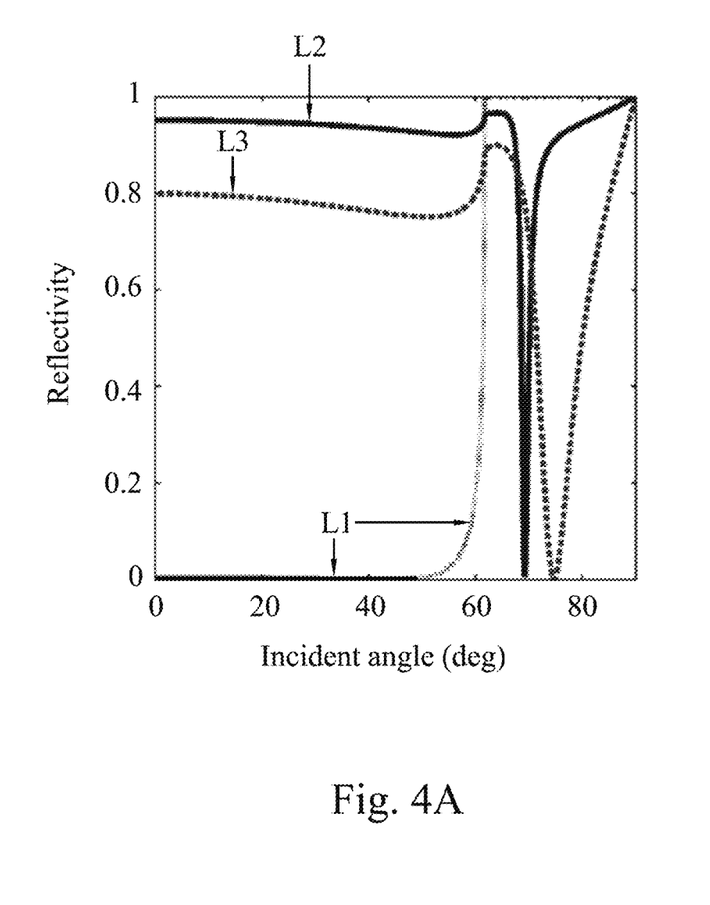
FIG. 4A is a schematic diagram illustrating a reflectivity versus incident angle without the biological specimen on the substrate.

Reference is made to FIG. 4A. FIG. 4A is a schematic diagram illustrating a reflectivity versus incident angle θ (degrees) without the biological specimen 206 on the substrate 204. A line L1 represents a pure TIR substrate (i.e., buffer solution 209—biolayer 2046—glass substrate 2042). An incident light (e.g., the light beam 202) is in TM-mode. A solid line L2 and a dotted line L3 represent the SPP-enhanced substrate (i.e., buffer solution 209—biolayer 2046—metal layer 2044—glass substrate 2042) under the PBS solution. The metal layer 2044 is made of Ag (solid line L2) or gold (Au) (dotted line L3). Relative permittivities of different layers in the embodiments illustrated by FIG. 4A are provided as follows: 2.295 (the glass substrate 2042); −18.087+0.697j (the metal layer 2044 made of Ag, thickness=50 nm); −11.265+1.462j (the metal layer 2044 made of Au, thickness=50 nm); $(1.46)^2$ (the biolayer 2046, thickness=10 nm); $(1.334)^2$ (the buffer solution 209). For the pure TIR substrate, the TIR condition occurs at about 60 degrees. For the SPP-enhanced substrate, when Au and Ag are used for the metal layer 2044, the resonance condition is achieved to induce a surface plasmon resonance (SPR) at the interface between the metal layer 2044 and the biolayer 2046. In these embodiments, a maximum enhancement of an electric field compared with a magnitude of the incident light beam 202 is 1.55 times (pure TIR substrate with the incident angle θ=69.23 degrees), 3.45 times (metal layer 2044 made of Au with the incident angle θ=74.67 degrees), and 8.09 times (metal layer 2044 made of Ag with the incident angle θ=69.23 degrees), respectively. Consequently, considering the enhancement of the electric field and the aperture size of the objective, the metal layer 2044 made of Ag on the glass substrate 2042 is subsequently utilized as the SPP-enhanced substrate in most of the embodiments in the present disclosure. Moreover, Ag, especially the flat Ag layer with the roughness less than or equal to about 5 nm is chosen in some embodiments of the present disclosure so as to achieve significantly greater enhancement of the electric field of the light beam 202 and better homogeneity of the electric field of the SPP exited light beam 202 to excite the fluorescence signals 208. It is noted that a selection of the thiolate layer 2046A (refractive index (n)=1.49) and the fibronectin (n=1.46) have a benefit on reducing variations in the enhancement of the electric field and the variations of the resonance angles since the selection may increase the homogeneity of the biolayer 2046.

Figure 4B:
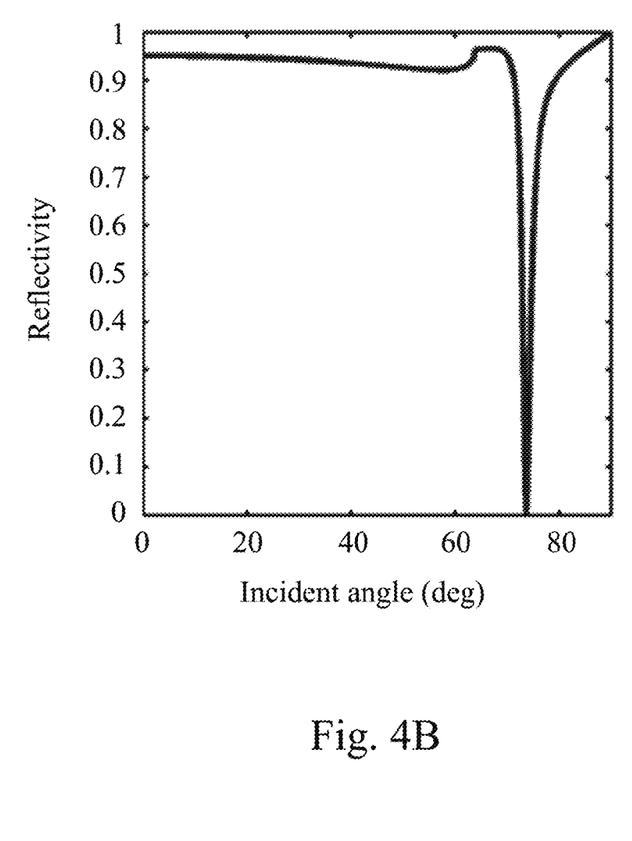
FIG. 4B is a schematic diagram illustrating a reflectivity versus incident angle with the biological specimen on the substrate.

FIG. 4B is a schematic diagram illustrating a reflectivity versus incident angle θ (degrees) regarding the biological specimen 206 on the substrate 204. A solid line represents the SPP-enhanced substrate with the biological specimen 206 thereon (i.e., cytoplasm 2064—cell membrane 2062—buffer solution 209—biolayer 2046—metal layer 2044 made of Ag—glass substrate 2042, as referred to FIG. 2). A thickness of the cell membrane 2062 is about 10 nm, and the refractive indices of the cell membrane 2062 and the cytoplasm 2064 are 1.46 and 1.36, respectively. The resonance angle is about 73.66 degrees, and the corresponding maximum enhancement of the electric field is about 6.58 times compared with the magnitude of the incident light (e.g., the light beam 202).

Figure 5:
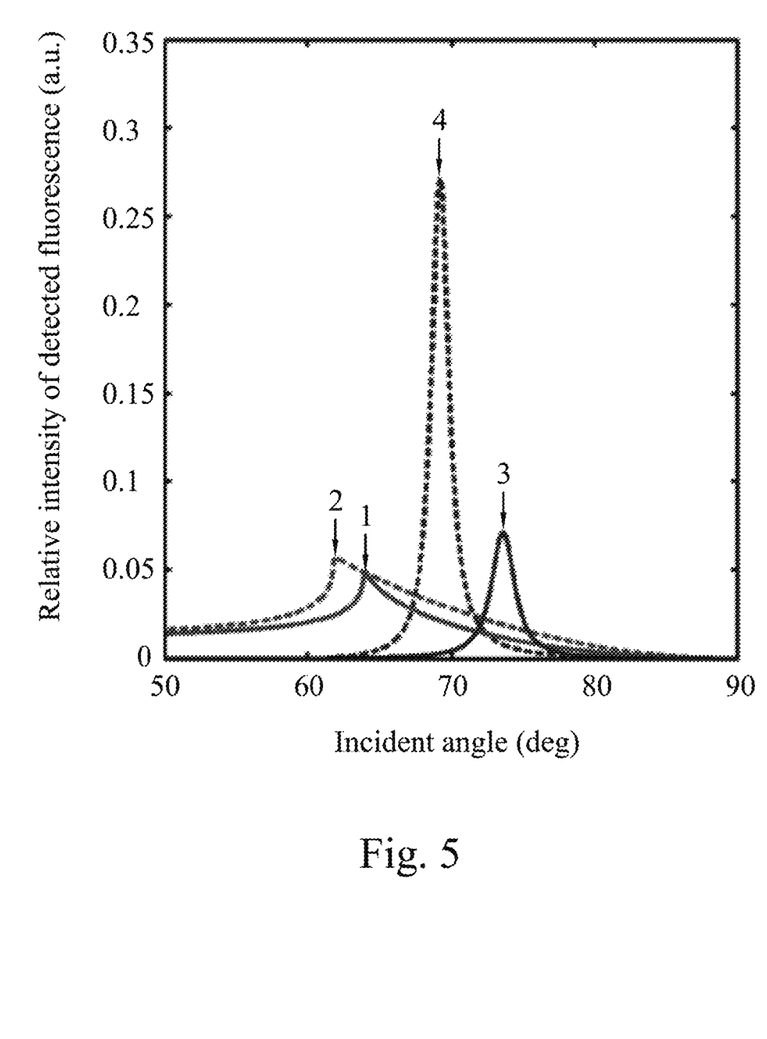
FIG. 5 is a schematic diagram illustrating relative intensities of detected fluorescence signals of HMSiR fluorophores versus incident angles on a pure TIR substrate and a SPP-enhanced substrate measured in a configuration illustrated by FIG. 3.

Reference is made to FIG. 5. FIG. 5 is a schematic diagram illustrating relative intensities of detected fluorescence signals 208 of the HMSiR fluorophores versus incident angles θ on the pure TIR substrate (solid line 1 and dotted line 2) and the SPP-enhanced substrate (solid line 3 and dotted line 4) measured in a configuration illustrated by FIG. 3. These detected fluorescence signals are collected on the side of the buffer solution 209 or the cytoplasm 2064 (e.g., collected by the second objective lens 303 as exemplified in FIG. 3). The solid line 1 and the dotted line 2 represent the HMSiR fluorophore on the glass substrate 2042 with/without the attachment of the biological specimen 206, respectively. The solid line 3 and the dotted line 4 represent the HMSiR fluorophore on the SPP-enhanced substrate with the metal layer 2044 made of Ag with/without the attachment of the biological specimen 206, respectively. Specifically, when it is without the biological specimen 206 attachment, the HMSiR fluorophores are at the surface of the biolayer 2046 on the above two different substrates. When there is the biological specimen 206 attachment, the HMSiR fluorophores are within the cytoplasm 2064. In the embodiments illustrated by FIG. 5, the vinculin proteins in the focal adhesions, which have been mentioned above, are selected as the biological specimen 206 for the measurement. The HMSiR fluorophores are located 50 nm from an interface between the glass substrate 2042 and the biolayer 2046 for the pure TIR substrate and the interface between the metal layer 2044 and the biolayer 2046 on the SPP-enhanced substrate. From the results as shown in FIG. 5, it is found that if the energies of the light beam 202 irradiating the biological specimen 206 on these two different substrates as mentioned are constant, the fluorescence signals 208 from the SPP-enhanced substrate has a higher fluorescence than those from the pure TIR substrate. Moreover, if the fluorescence signals 208 from the two different substrates have the same value, energy of the light beam 202 required for irradiating the biological specimen 206 on the SPP-enhanced substrate is lower than that required for irradiating the biological specimen 206 on the pure TIR substrate. Therefore, the phototoxicity of the biological specimen 206 on the SPP-enhanced substrate is decreased compared to the case when the biological specimen 206 is on the pure TIR substrate.

Figure 6A:
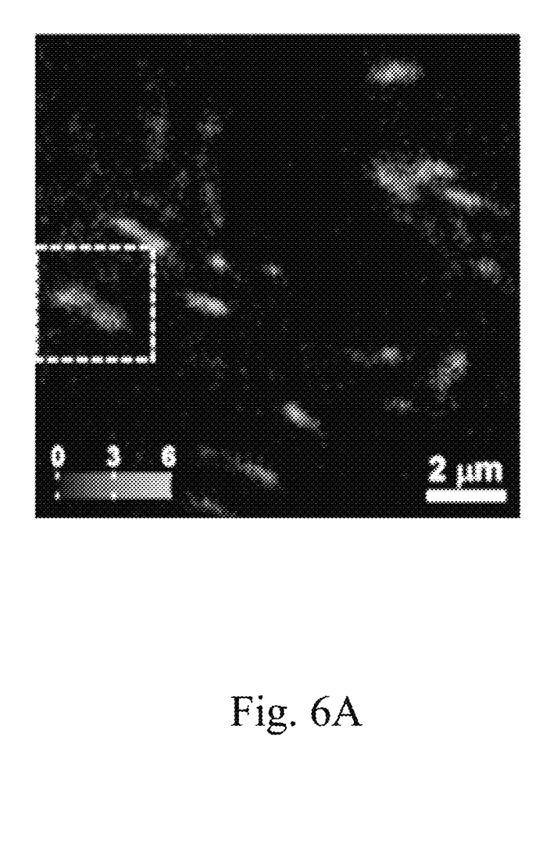
FIG. 6A is a single-molecule fluorescence localization image of vinculin proteins labeled with the HMSiR fluorophores on the SPP-enhanced substrate.
Figure 6B:
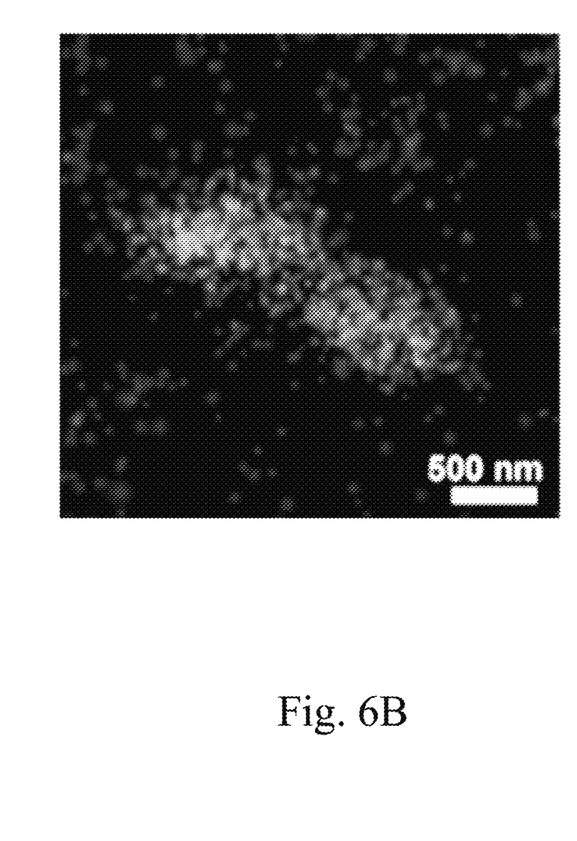
FIG. 6B is an enlarged view of a portion of the single-molecule fluorescence localization image in a dotted frame as shown in FIG. 6A.

Reference is made to FIGS. 6A and 6B. FIG. 6A is a single-molecule fluorescence localization image of the vinculin proteins labeled with the HMSiR fluorophores on the SPP-enhanced substrate. FIG. 6B is an enlarged view of a portion of the single-molecule fluorescence localization image in a dotted frame as shown in FIG. 6A. It is noted that an excitation power density for deriving images shown in FIGS. 6A and 6B is only 31.6 W/cm$^2$, which is about two orders of magnitude lower than conventional ways of deriving a single-molecule fluorescence localization image, which is within an order of kilos W/cm. The power reduction is due to a local field enhancement of the SPP-enhanced substrate which causes an occurrence of more bright localized events.

Figure 7A:
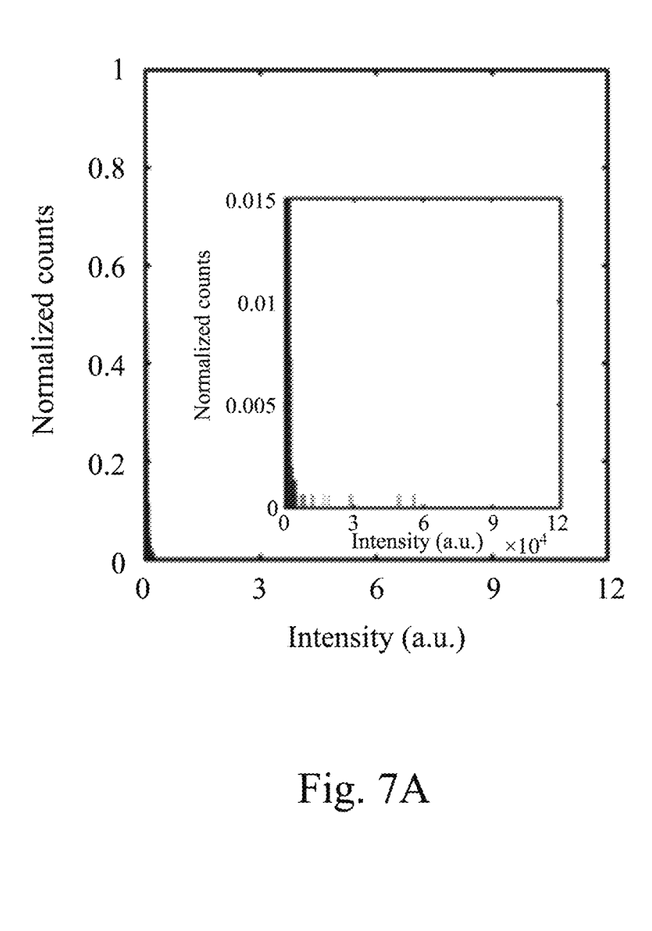
FIG. 7A is an intensity distribution of fluorescence signals emitted from all localization events for the pure TIR substrate calculated as a histogram.
Figure 7B:
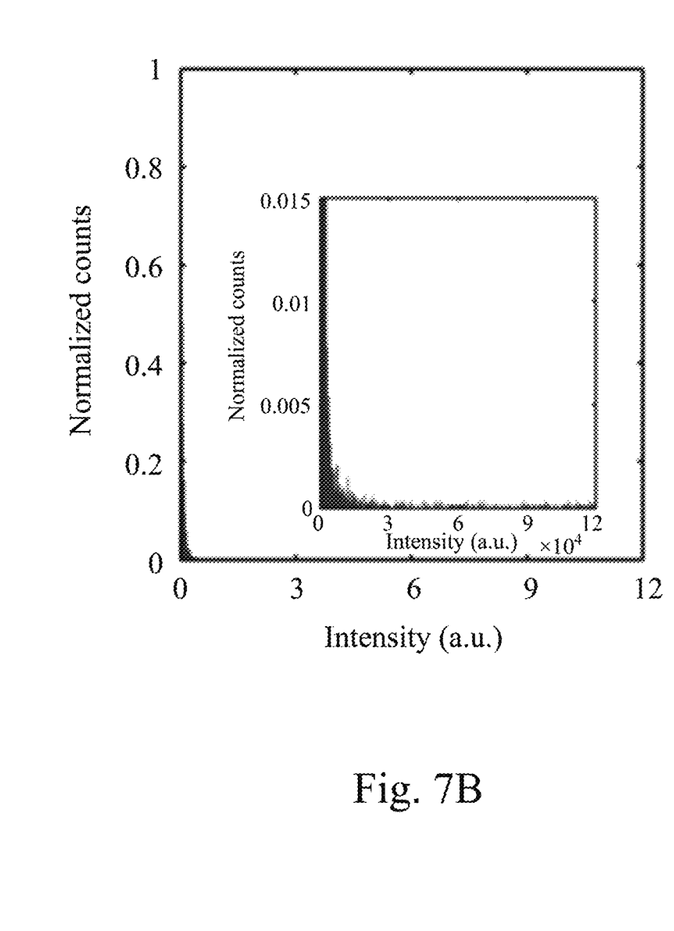
FIG. 7B is an intensity distribution of fluorescence signals emitted from all localization events for the SPP-enhanced substrate calculated as a histogram.

Reference is made to FIGS. 7A and 7B. FIG. 7A is an intensity distribution of fluorescence signals emitted from all localization events for the pure TIR substrate calculated as a histogram. FIG. 7B is an intensity distribution of fluorescence signals emitted from all localization events for the SPP-enhanced substrate calculated as a histogram. The localization events on the SPP-enhanced substrate have more counts in the high fluorescence intensities than that on the pure TIR substrate. Mean fluorescence intensity for the TIR substrate and the SPP-enhanced substrate are 511 and 1616 counts, respectively. A SPP-enhancement effect enables the HMSiR fluorophores to exhibit brighter fluorescence signals. This result indicates that more emitted photons (from a single emitter, e.g., a single HMSiR fluorophores) and localization events can be obtained by using single-molecule localization imaging.

Figure 8:
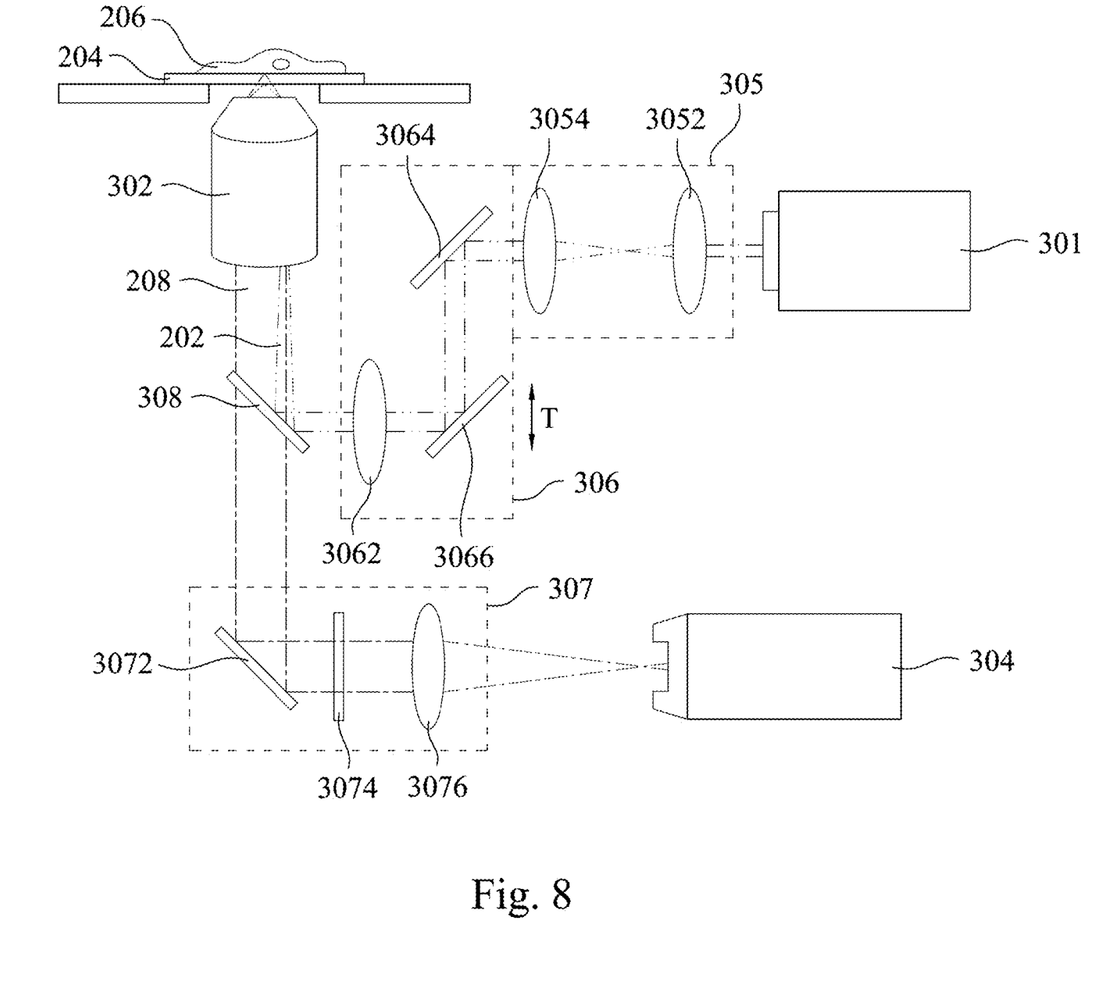
FIG. 8 is a schematic optical path diagram of an optical imaging system according to some embodiments of the present disclosure.

Reference is made to FIG. 8. FIG. 8 is a schematic optical path diagram of an optical imaging system 300B according to some embodiments of the present disclosure. A difference between the embodiments illustrated by FIG. 8 and the embodiments illustrated by FIG. 3 is that only one objective lens (i.e., the first objective lens 302) is used in the optical imaging system 300B, which facilitates practical applications. A beam splitter 308 (e.g., a dichroic mirror) can be used to split optical paths of the incident light beam 202 and the output fluorescence signals 208. Specifically, the incident angle θ between the direction of the light beam 202 and the normal direction of the metal layer 2044 is adjusted to match an excitation condition of the SPCE, such that the fluorescence signals 208 can be collected on the same side of the light beam 202 with respect to the substrate 204. In the configuration illustrated by FIG. 8, the incident angle θ is adjusted to about 73.4 degrees for better quality of fluorescence signals 208.

Figure 9:
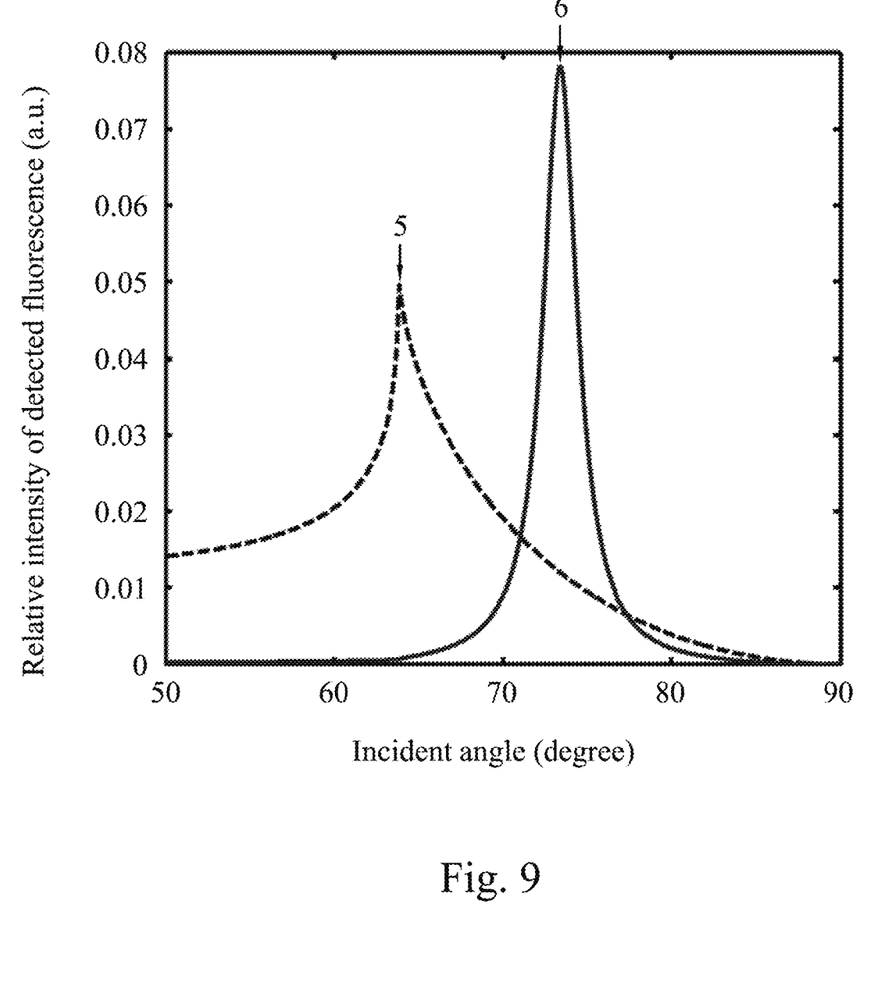
FIG. 9 is a schematic diagram illustrating relative intensities of detected fluorescence signals of HMSiR fluorophores versus incident angles on the SPP-enhanced substrate measured in a configuration illustrated by FIG. 8.

Reference is made to FIG. 9. FIG. 9 is a schematic diagram illustrating relative intensities of detected fluorescence signals 208 of the HMSiR fluorophores versus incident angles θ on the SPP-enhanced substrate measured in a configuration illustrated by FIG. 8. These detected fluorescence signals are collected on the side of the glass substrate 2042 (e.g., collected by the first objective lens 302 as exemplified in FIG. 8). The dotted line 5 and the solid line 6 represent the HMSiR fluorophore on the pure TIR substrate and the SPP-enhanced substrate, respectively. The metal layer 2044 of the SPP-enhanced substrate is made of Ag. The biological specimens 206 are attached to the pure TIR substrate and the SPP-enhanced substrate, respectively. By comparing the dotted line 5 and the solid line 6, it is found that the fluorescence signals 208 from the SPP-enhanced substrate has a higher fluorescence than those from the pure TIR substrate when the energies of the light beam 202 irradiating the biological specimen 206 on these two different substrates as mentioned are constant. As a result, under the configuration as illustrated by FIG. 8, energy of the light beam 202 required for irradiating the biological specimen 206 on the SPP-enhanced substrate is lower than that required for irradiating the biological specimen 206 on the pure TIR substrate when the fluorescence signals 208 from the two different substrates have the same value.

The embodiments as mentioned above in the present disclosure reveal an enhanced fluorescence in the single-molecule localization microscopy utilizing the SPP-enhancement or the SPCE effect, which increases the strength of the fluorescence signals 208 and the blinking number of the HMSiR fluorophores, and decreases an excitation power density requirement of the light beam 202. A lower excitation power density prevents the biological specimen 206 from damage, which makes it more suitable for living samples. On the other hand, in a localized surface plasmon enhanced effect through conventional metal nanostructures and nanoparticles, the strength and distribution of the enhanced electric field depend on the hotspots and thus are correlated with the morphology of the metal nanostructures and nanoparticles. The nonuniform distribution of the enhanced electromagnetic field interferes with a fluorescence imaging which is used to enable visualization of the distribution of the proteins and structures of the specimens. The SPP-enhanced substrates used in some of the above embodiments in the present disclosure utilize a flat metal film (e.g., the flat Ag thin film) to create a uniform distribution of the enhanced electric field at the interface between the metal layer 2044 and the buffer solution 209 (or the biolayer 2046). Consequently, nonuniform field enhancement is eliminated so as to enable visualization of protein distributions in the cells more accurately in their position.

In summary, a method of forming an enhanced super-resolution image is provided in the embodiments of the present disclosure to realize a combination of advantages of low excitation power density down to 31.6 W/cm², a uniform distribution of an enhanced electric field, and a super-resolution image with a localization resolution of 25±11 nm. The above advantages can be realized at the same time because of the selections and fabrications of spontaneous bilking elements and a SPP-enhanced substrate with a flat Ag layer therein and further in cooperation with a suitable incident angle of a light beam with respect to a normal direction of a surface of the SPP-enhanced substrate.

Trivial details of some embodiments in the present disclosure, including a preparation of the vinculin proteins of the A549 cells for imaging, more evidences on proving the superiority (i.e., super-resolution plus the lower excitation power density) of the single-molecule fluorescence localization images derived from the combination of SPP-enhanced substrate illustrated above and the HMSiR fluorophores for labeling, and physical principles on some embodiments of the present disclosure can be found in *Phys. Chem. Chem. Phys.*, 2018. 20. 27245-27255. This publication includes some specific embodiments in the present disclosure and is submitted with the present application in accordance with prior art exception under AIA 35 U.S.C. 102(b)(1)(A) to AIA 35 U.S.C. 102(a)(1) (grace period inventor or inventor-originated disclosure exception).

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A method of forming an enhanced super-resolution image, comprising:
   preparing a substrate comprising a glass substrate, a metal layer on the glass substrate, and a biolayer on the metal layer;
   placing a biological specimen on the substrate, the biological specimen being in contact with the biolayer and being attached to the metal layer through the biolayer, wherein the biological specimen is labeled by a plurality of spontaneous blinking elements therein, and a shortest distance between the spontaneous blinking elements and the metal layer is greater than or equal to about 10 nm;
   irradiating a light beam to the metal layer via the glass substrate;
   receiving fluorescence signals emitted from the spontaneous blinking elements within a time period;
   fitting a plurality of functions respectively to each of the fluorescence signals;
   pinpointing peak positions of the functions; and
   reconstructing the peak positions to derive the enhanced super-resolution image of an underlying structure of the biological specimen in proximity to the metal layer.

2. The method of claim 1, wherein an incident angle between a direction of the light beam and a normal direction of the metal layer is in a range between about 68.5 degrees and about 75 degrees.

3. The method of claim 1, wherein the biolayer comprises:
   a thiolate layer; and
   a protein layer on the thiolate layer, wherein the thiolate layer is in contact with the metal layer, and the protein layer is in contact with the biological specimen.

4. The method of claim 3, wherein the protein layer is a fibronectin layer.

5. The method of claim 1, wherein the metal layer is a flat silver (Ag) layer without nanostructure therein, and a root mean square of roughness of the flat Ag layer is less than or equal to about 5 nm.

6. The method of claim 1, wherein a thickness of the Ag layer is in a range between about 40 nm and about 55 nm.

7. The method of claim 1, wherein the spontaneous blinking elements comprise rhodamine derivatives with an intramolecular spirocyclization.

8. The method of claim 1, wherein the spontaneous blinking elements comprise a blinking quantum dots material.

9. The method of claim 1, wherein the functions are two-dimensional elliptical Gaussian functions.

* * * * *